(12) United States Patent
Plaszcz

(10) Patent No.: US 7,252,401 B1
(45) Date of Patent: Aug. 7, 2007

(54) PHOTOLUMINESCENT TUBE SYSTEM

(76) Inventor: Steve F. Plaszcz, 5769 Ellice Trail, Apple Valley, MN (US) 55124

( * ) Notice: Subject to any disclaimer, the term of this patent is extended or adjusted under 35 U.S.C. 154(b) by 227 days.

(21) Appl. No.: 10/840,778

(22) Filed: May 6, 2004

(51) Int. Cl.
  *F21V 9/16* (2006.01)
(52) U.S. Cl. .......................... 362/84; 362/34; 362/101; 362/171; 362/240
(58) Field of Classification Search .............. 362/84, 362/34, 101, 102, 171, 178, 240, 249, 252; 206/443, 364–366, 418, 419
See application file for complete search history.

(56) References Cited

U.S. PATENT DOCUMENTS

| | | | |
|---|---|---|---|
| 1,654,370 | A | 12/1927 | Goetschuis |
| 2,358,867 | A | 9/1944 | Madan |
| 2,568,279 | A | 9/1951 | Franz et al. |
| 3,707,985 | A * | 1/1973 | Haase et al. ............... 137/495 |
| 3,796,869 | A | 3/1974 | Stone |
| 4,161,388 | A | 7/1979 | Bouchard et al. |
| 4,209,823 | A | 6/1980 | Burkdoll |
| 4,927,015 | A | 5/1990 | Jones |
| 5,300,783 | A | 4/1994 | Spencer et al. |
| 5,311,413 | A | 5/1994 | Farmer et al. |
| 5,388,039 | A * | 2/1995 | Dolph ........................ 365/154 |
| 5,671,539 | A | 9/1997 | Barone |
| 5,830,034 | A | 11/1998 | Ciechanowski et al. |
| 5,918,960 | A * | 7/1999 | Hopwood et al. ............ 356/71 |
| 6,048,280 | A | 4/2000 | Palmer et al. |
| 6,159,878 | A | 12/2000 | Marsh |
| 6,244,723 | B1 | 6/2001 | Talamo |
| 6,360,891 | B1 * | 3/2002 | Rideout ........................ 206/373 |
| 6,561,119 | B1 | 5/2003 | Rigitano |

2002/0122306 A1 * 9/2002 O'Connell .................. 362/145

OTHER PUBLICATIONS

Technical Data Sheet for GLO-FLEX® Total Visibility™ Trim—Traditional GF—dated 2001.
Jan. 19, 2004 print-out from ezlz.com (original date unknown).
Jan. 27, 2004 Print-out from omniglow.com (original date unknown).
Apr. 1, 2004 print-out from glowsticks-party-supplies.com (original date unknown).
Apr. 1, 2004 print-out from readysetglo.com (original date unknown).
Apr. 1, 2004 print-out from extremeglow.com (original date unknown).

* cited by examiner

Primary Examiner—Sandra O'Shea
Assistant Examiner—Mark Tsidulko
(74) Attorney, Agent, or Firm—Dicke, Billig & Czaja, PLLC

(57) ABSTRACT

A plurality of signal wands having a handle and a signaling portion comprising photoluminescent material and a high visibility pigment are stored in a lighted receptacle for use in either high light or low light conditions. Openings provided in one wall of the receptacle permit the signaling portion of each signal wand to be inserted into an internal chamber of the receptacle, which houses a plurality of full spectrum light bulbs. The signal wands and light bulbs are oriented relative to one another in a pattern that ensures that the signaling portions are substantially surrounded by light. Exposed to light for as little as five minutes, the signaling portion of the signal wands glow with sufficient intensity and for a sufficient duration to signal vehicles, such as aircraft operating near airport gates, in low light conditions. The high visibility pigment associated with the signaling portion enables the signal wands also to be used for daytime signaling.

7 Claims, 10 Drawing Sheets

PHOTOLUMINESCENT TUBE SYSTEM

CROSS-REFERENCE TO RELATED APPLICATION(S)

None.

BACKGROUND OF THE INVENTION

This invention relates to a signaling system. More specifically, this invention relates to a photoluminescent signaling system for guiding vehicles, such as aircraft, in both low and high light conditions.

Commercial aircraft requires a ground based signaling system to guide aircraft towards and away from airport gates. A ground crew of five individuals, including a supervisor, a marshaller, a driver of a pushout tractor and two wingwalkers, is used to safely guide aircraft. The marshaller stands on the ground at the front of the plane and has contact with the pilot via a headset. The driver of the pushout tractor uses the pushout tractor to push the plane into place. The wingwalkers stand on the ground on opposite sides of the plane towards the rear. The wingwalkers are responsible for escorting the aircraft away from the gate to a ramp where the aircraft is released for taxiing. The wingwalkers use signaling wands to signal the marshaller, who communicates with the pilot via the headset worn by the marshaller. The supervisor oversees the marshaller, the driver, the wingwalkers, and the operation generally.

During the day, the wingwalkers use a first type of signaling wands, i.e., day wands, having a high visibility color. At night, the wingwalkers generally use a second type of signaling wands consisting of lighted flashlights. The lighted flashlights may contain yellow cone extensions that cover the lighted end.

The current signaling wand system has its drawbacks. At times, the wingwalkers are unable to locate the flashlights from the previous shift or the batteries of the flashlights expire. Occasionally, day wands, which do not light up, are used during evening hours. In addition, if wingwalkers are working at dawn or dusk, the crew must decide when the night or day wands should be exchanged. In inclement weather, the crew must decide which signaling wand is best suited for the conditions, which also leaves room for judgment error. There is a need for an improved signaling system that is inexpensive, reliable and easy to use in both high light and low light conditions.

BRIEF SUMMARY OF THE INVENTION

The present invention is a signal wand storage system that comprises a receptacle, a light source within the receptacle and a signal wand having a handle and a signal portion. The light source within the receptacle is electrically connected to a power source. The signal portion of the signal wand comprises a photoluminescent material. The signal portion of the signal wand is positionable relative to the light source to excite the photoluminescent material and is removable from the receptacle for use in signaling during low light conditions.

DETAILED DESCRIPTION

Figure 1:
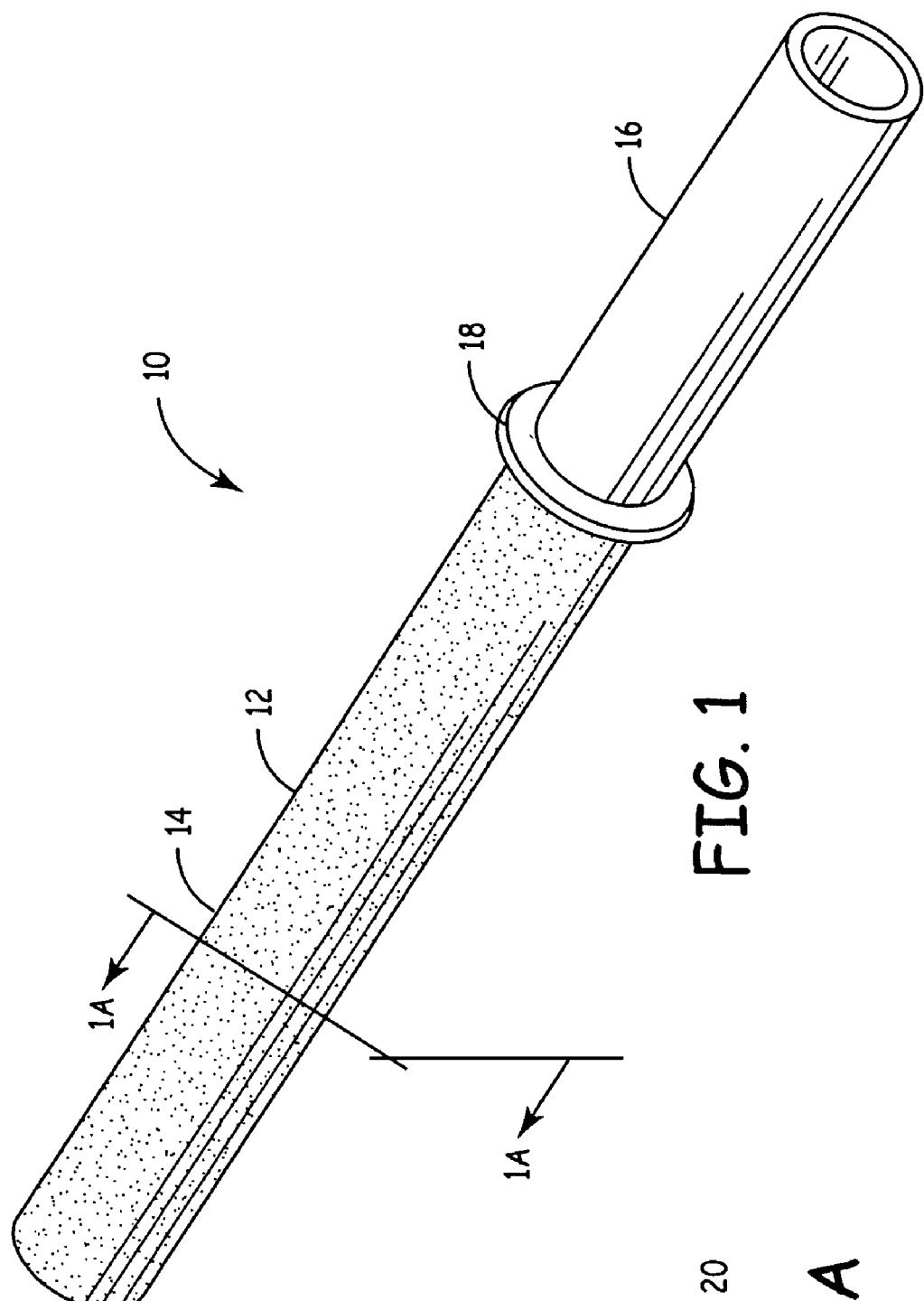
FIG. 1 is a perspective view of a first embodiment of a photoluminescent signal wand of the present invention.
Figure 1A:
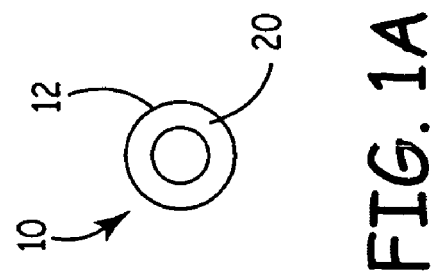
FIG. 1A is a cross-sectional view of the signal wand of FIG. 1.

The present invention comprises an easily constructed, low cost photoluminescent signal wand that functions in both daylight and night/low light-conditions. FIG. 1 is a perspective view of a first embodiment of signaling wand of the present invention. Signaling wand 10 is comprised of an elongate tubular body 12 having a signaling portion 14, a handle portion 16 and a collar 18 therebetween which surrounds the tubular body 12. In one embodiment, tubular body 12 is formed by molding or extruding a mixture consisting of a translucent thermoset resin, a high visibility pigment and a light activated phosphorescent powder, of which the phosphorescent powder is approximately thirty percent by volume. The mixture is mixed to equally disperse the pigment and phosphorescent powder in the resin and a hardener is added to cure the mixture to maintain the dispersion of the pigment and phosphorescent powder. After these materials are mixed they may be extruded or molded to form a tube, as shown in the cross-sectional view of tubular body 12 in FIG. 1A.

The wall thickness of tubular body 12 is selected to be thin enough to permit a full spectrum light source to penetrate through the wall and excite the phosphorescent material distributed throughout the wall and yet is thick enough to maximize the volume of phosphorescent material to obtain the properties of a quick light energizing time and a long phosphorescence time. In one embodiment, the tubular body 12 has length of about 14 inches and a wall 20 with a thickness of between about ⅛ inch to about ¼ inch. For instance, an embodiment of tubular body 12 having a ¼" wall thickness exposed to a full spectrum light for approximately five minutes will glow for over 12 hours, with the highest glow intensity occurring in the initial 20-30 minute period after exposure to the light source. In the preferred embodiment, the phosphorescent powder is an alkaline earth aluminate produced by ReadySetGo of Gimli, Manitoba Canada.

The visibility of signal wand 10 for daytime use is enhanced by use of the high visibility fluorescent pigment. If the signaling wand 10 is left exposed to the ambient sun light the phosphorescent material in the signaling wand 10 is excited. Thus, if used during the day, the signaling wand 10 will glow and remain visible as light levels decrease at dusk. The signaling wand of the present invention is particularly suited for marking runway boundaries in remote areas where there is no electrically powered lighting. For such a purpose, an alternate embodiment of the signaling wand of the present invention may be configured to increase the surface area of the signaling wand that is exposed to the sun light and thereby increase the visibility of the signaling wands marking the runway boundaries. By way of a non-limiting example, signaling wands may be formed, to have a hemispherical, dome-like appearance. Other configurations that permit the signaling wand to be viewed from a variety of different directions, such as cones, pyramids, etc. are also well suited for marking runway boundaries. The size of the signaling wands and spacing of the signaling wands relative to one another is selected to provide adequate visibility of the runway boundaries. In one example, a close spacing may be utilized to mark runway end portions and a greater spacing to mark the length of the runway.

Referring again to FIG. 1, for ease of construction of signaling wand 10, the collar 18 and handle portion 16 may be formed out of the same material as the signaling portion 14. Alternatively, the collar 18 and handle portion may be added to the signaling portion 14. Collar 18 and handle portion 16 may, for example be constructed of textured non-slip rubber formed like a bicycle grip and slipped on to an end of signaling portion 14.

Figure 2:
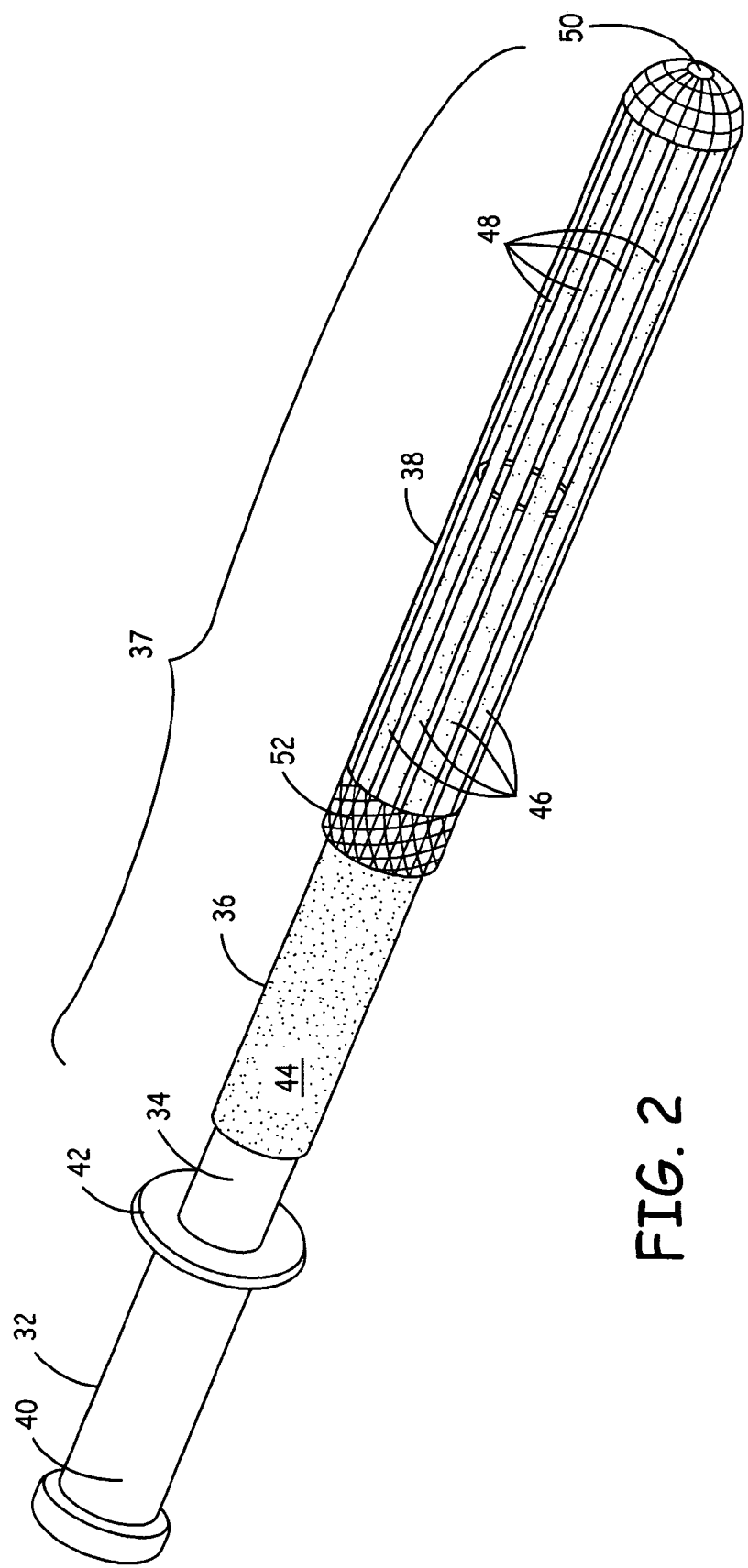
FIG. 2 is a partially exploded perspective view of a seconds embodiment of a photoluminescent signal wand of the present invention.

FIG. 2 is a perspective view of an alternate embodiment of signal wand 30 of the present invention. As shown in FIG. 2, signal wand 30 generally includes a handle 32, a support member 34, a middle tube 36 and an outer tube 38. Handle 32 may be constructed of a lightweight, grippable material and, like a bicycle grip, have a graspable portion 40 and a flange 42 formed on one end. Handle 32 has an inner cavity that is sized and configured to fit on to the end of support member 34.

Support member 34 may be any elongate structure that has adequate strength and durability to support middle tube 36 and outer tube 38. In one embodiment, support member 34 is a length of tubing made from polyvinylchloride.

Middle tube 36 is formed from a durable polymeric tube, such as polycarbonate, having an inner diameter that is sized to fit over support member 34. The exterior of middle tube 36 is comprised of photoluminescent material 44, which may be applied in any of a number of known techniques. In one preferred embodiment, photoluminescent material 44 is applied by overlying successive layers of adhesive and photoluminescent powder to achieve a high density volume of photoluminescent material with minimal intervening material for optimum glowing properties of middle tube 36. A suitable coating of photoluminescent material has been achieved by applying a thin layer of an acrylic adhesive on the exterior surface of polycarbonate tubing, coating the adhesive completely with an alkaline earth aluminate photoluminescent powder as previously described and allowing the adhesive to dry. Subsequent layers of the acrylic adhesive and photoluminescent powder were applied in a like manner to create four layers of photoluminescent powder of approximately 0.25 inches in thickness. Middle tube 36 has a length that equals the length of the portion of support tube 34 extending from handle 32.

Outer tube 38 is formed from a thin walled, durable polymer, such as polycarbonate. In one embodiment, outer tube 38 is formed with alternating longitudinal broad strips 46 of polycarbonate colored with a high visibility pigment and longitudinal narrow strips 48 of clear polycarbonate, for example, in a co-extrusion process. The clear strips 48 permit light to access the photoluminescent material 44 on middle tube 36, while the pigmented strips 46 permit signal wand 30 to be readily seen during daytime use. Outer tube 38 has a length equal to middle tube 36. In use, both middle tube 36 and outer tube 38 abut the flange 42 of handle 32 and define a signal portion 37 of signal wand 30. Middle tube 36 and outer tube 38 are secured to support member 34 by an end cap 50. For improved visibility of signal wand 30 during night time use, end cap 50 and inner end 52 of outer tube 38 may include a light reflective material. The spacing of clear strips 48 and pigmented strips 46 and the relatively thin wall construction of outer tube 38 permits light emitted by the photoluminescent material 44 on middle tube 36 to be clearly seen in low light or nighttime conditions.

Figure 3:
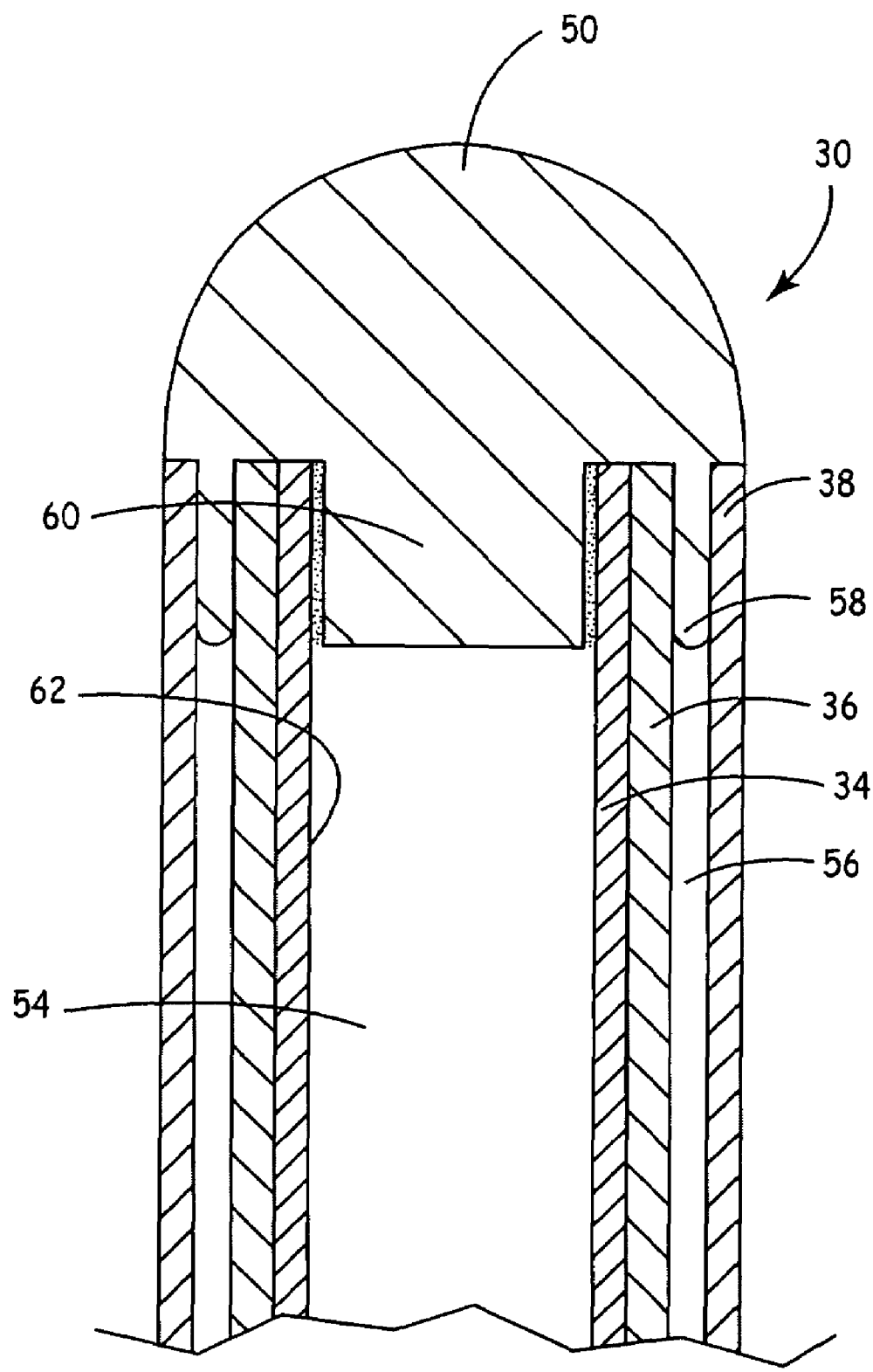
FIG. 3 is a cross-sectional view of the signal wand of FIG. 2.

FIG. 3 is an enlarged cross-sectional view of the end of signal wand 30 of FIG. 2. As shown in FIG. 3, support member 34 has a central space 54. Middle tube 36 has an inner diameter that permits middle tube 36 to fit closely over support member 34. Outer tube 38, however, has an inner diameter that is larger than middle tube 36 such that a gap 56 is created between outer tube 38 and middle tube 36. Gap 56 facilitates light passing through the clear strips of outer tube 38 to better reach the photoluminescent material on middle tube 36 that is radially spaced from the clear strips of outer tube 38. As shown in FIG. 3, gap 56 is defined and maintained by a circumferential flange 58 which extends from an inner end of cap 50. Cap 50 also is provided with a central extension 60 that is sized and configured to be received closely within the central space 54 of support member 34. Cap 50 is secured to support member 34 by applying a suitable adhesive between the central extension 60 and the inner wall 62 of support member 34.

Figure 4:
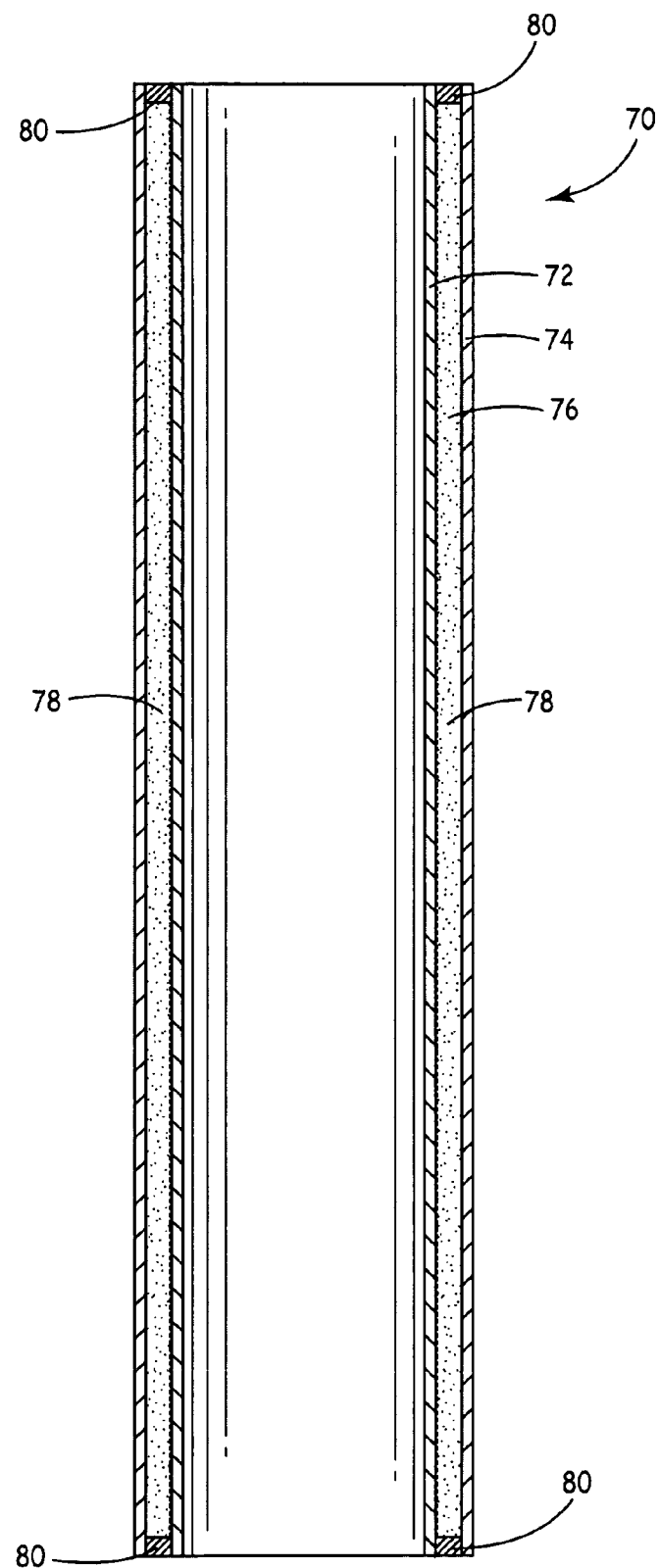
FIG. 4 is a longitudinal cross-sectional view of an alternative embodiment of a photoluminescent tube of the signal wand of FIG. 2.
Figure 5:
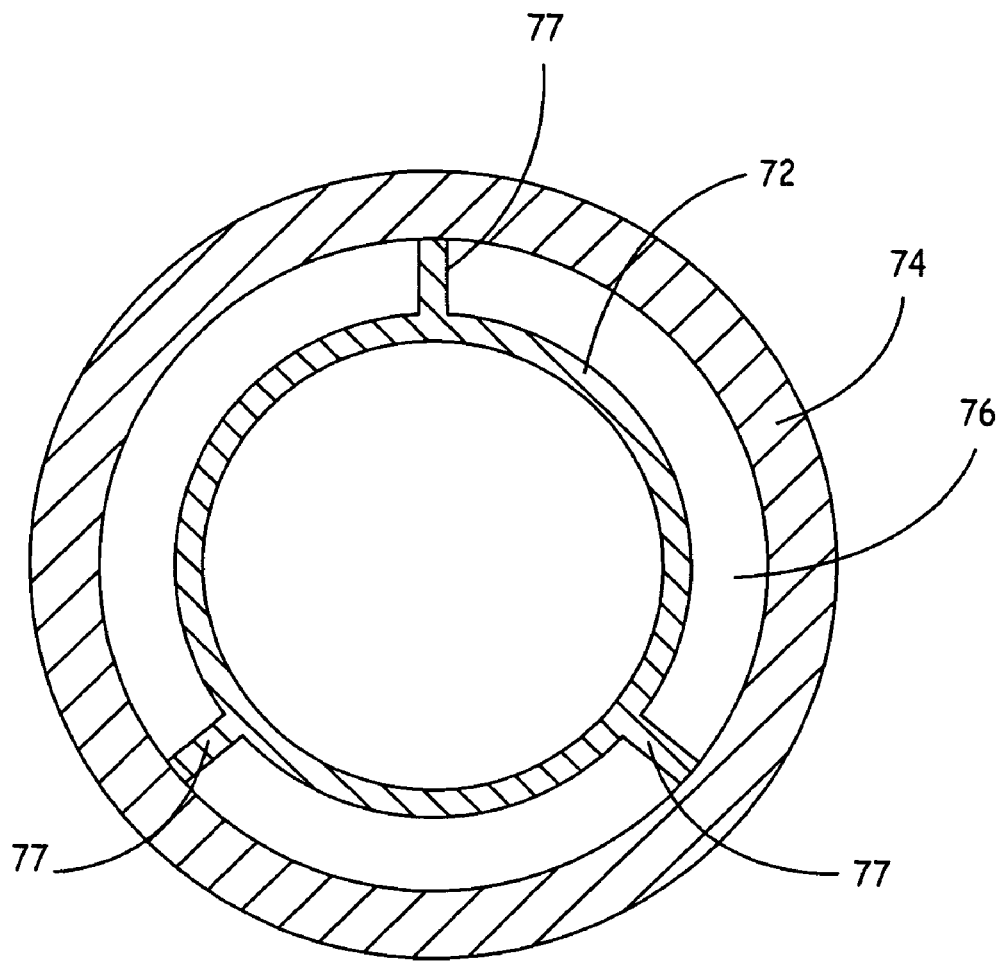
FIG. 5 is a cross-sectional view of the photoluminescent tube of FIG. 4.

FIG. 4 is a sectional view of a coaxial tube structure 70 that can be used in lieu of middle tube 36 of signal wand 30. As shown in FIG. 4, coaxial tube structure 70 comprises a first tube 72 and a second tube 74, both of which may be constructed of a clear, durable polymer, such as polycarbonate, and have a very thin tubular wall. Second tube 74 has an inner diameter that is larger than an outer diameter of first tube 72 to define a longitudinal space 76, which is then filled with photoluminescent powder 78. As shown in FIG. 5, first tube 72 is maintained coaxial to second tube 74 by a plurality of radially spaced standoffs 77 which may be integrally formed with first tube 72 during the extrusion process. In one embodiment, the distance between first tube 72 and second tube 74 defining longitudinal space 76 is about 0.03 inches. Referring again to FIG. 4, end plugs 80 located at each end of the coaxial tube structure 70 retain the photoluminescent powder 78 within the longitudinal space 76. By this construction, the density of photoluminescent powder is increased and intervening material is eliminated, which allows the coaxial tube structure 70 to achieve bright glowing properties with a smaller quantity of photoluminescent powder than prior embodiments.

While the aforementioned embodiments of the photoluminescent signal wand may be charged by exposure to natural sunlight, the optimum glow properties for nighttime signaling is better achieved by exposure of the photoluminescent signal wand to a full spectrum light source at or near the time of intended use during low light or nighttime conditions. Particularly for use in signaling aircraft toward and away from airport gates, the nighttime visibility of the signal wand of the present invention is enhanced by use of a signal wand storage system of the present invention that maintains one or more of the signal wands in intimate proximity to a broad spectrum light source until the signal wand is needed.

Figure 6:
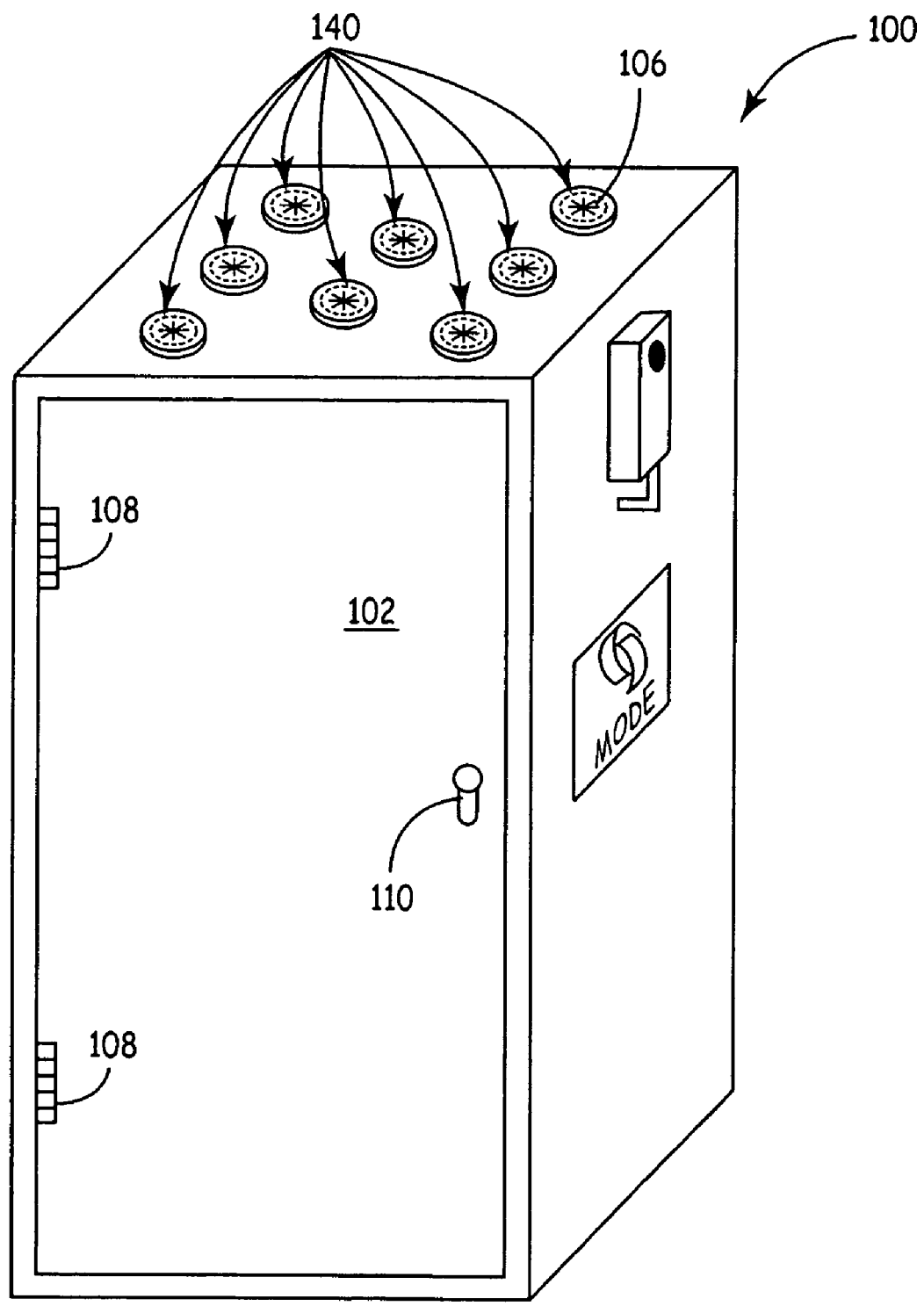
FIG. 6 is a front perspective view of a signal wand storage system of the present invention.

FIG. 6 is a perspective view of a receptacle 100 having a door 102 and one or more openings 104 formed in one wall of receptacle 100. Receptacle 100 is designed for containing a light source and storing one or more signal wands of the present invention relative to the light source in a proximity to an area in which vehicle signaling occurs. In one embodiment, openings 104 are covered by a diaphragm 106 formed from a flexible, water impervious material, such as rubber, to prevent or at least minimize moisture from entering into receptacle 100. Door 102 is mounted for opening, such as on hinges 108, and is provided with a handle 110 for accessing an interior of receptacle 100.

Figure 7A:
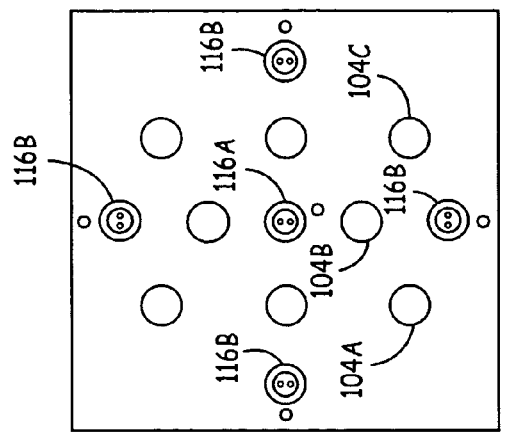
FIG. 7A is a top diagrammatic view of one embodiment of a pattern for storing signal wands of the present invention relative to a light source.
Figure 7:
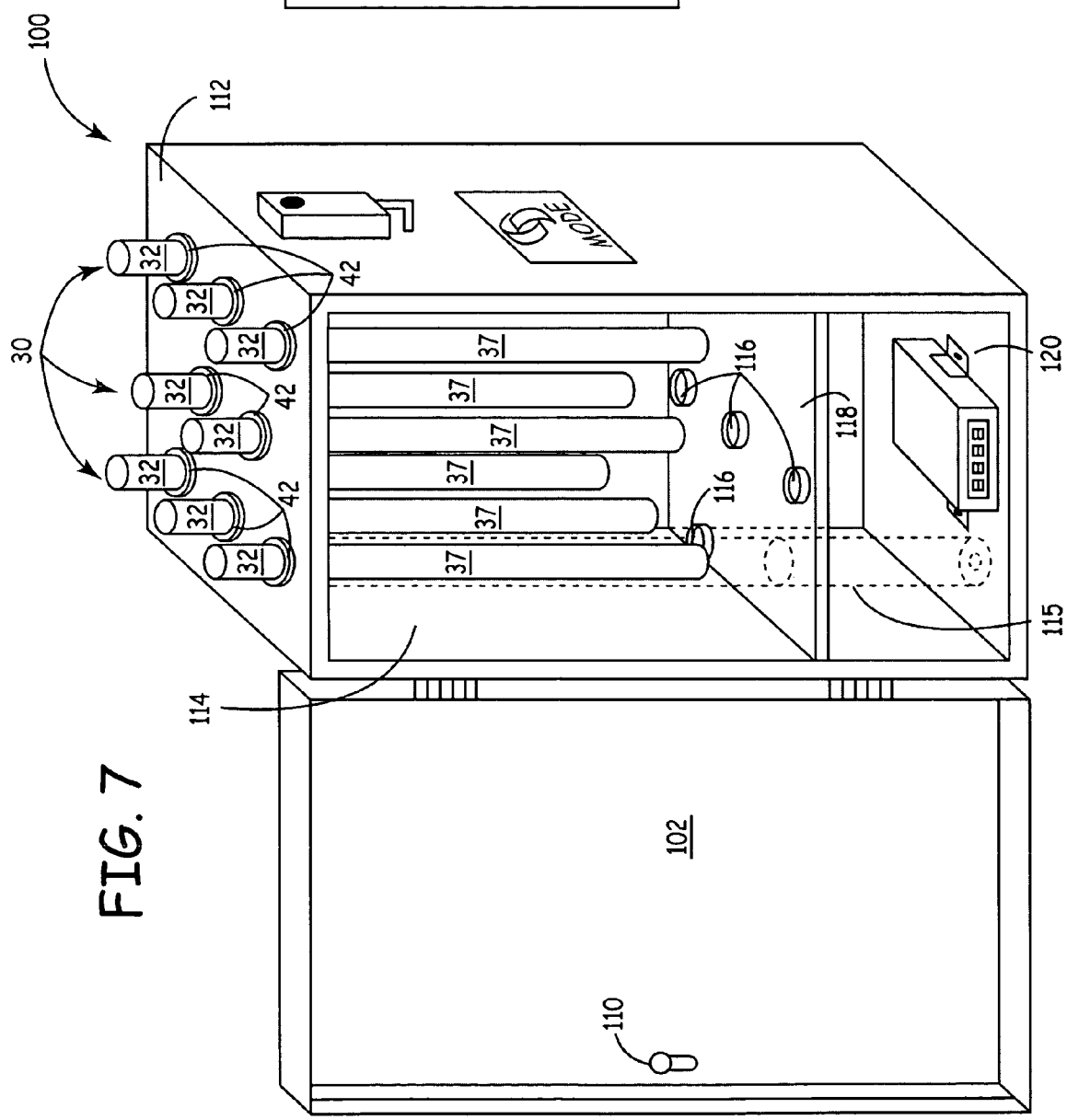
FIG. 7 is a front perspective view of an opened storage system of FIG. 6 with a plurality of signal wands of the present invention.

FIG. 7 is a perspective view of receptacle 100 with door 102 opened to show a plurality of signaling wands of the present invention, such as signal wand 30, supported by receptacle 100. In one embodiment, openings 104 are provided in a top 112 of receptacle 100 and are sized to permit the signal portion 37 of signal wands 30 to be inserted therethrough and to support signal wand 30 by flange 42 of handle 32. Supported in this manner, the signal portion 37 of signal wand 30 is located in an interior chamber 114 of receptacle 100 and flange 42 functions to seal openings 104 from elements such as dust and moisture. In one embodiment, a protective barrier, such as clear protection tube 115 (shown in phantom) may be provided within interior chamber 114 for each signal wand 30.

Also provided in the interior chamber 114 are one or more electrical sockets 116 for a light source that can charge the photoluminescent material associated with the signal portion 37 of signal wands 30. In one embodiment, electrical sockets 116 are mounted on an elevated floor 118 spaced from base 120 of receptacle 100. The electrical sockets 116 may be located relative to signal portion 37 of signal wand 30 in any number of patterns that ensure that the exterior of signal portion 37 is substantially surround by light while signal wands 30 are stored within receptacle 100.

FIG. 7A is a top diagrammatic view of one embodiment of a light distribution pattern suited for a pattern of openings 104 as shown in FIG. 7A. As shown in FIG. 7A, in one embodiment eight openings 104 may be arranged in three spaced rows 104A, 104B and 104C, with three openings 104 in each of rows 104A and 104C and two openings 104 in row 104B that are staggered relative to the openings of rows 104A and 104C. Electrical sockets 116 are distributed in a pattern to achieve equal light distribution relative to signal portions 37, with a central socket 116A located in between openings 104 of row 104B and with peripheral sockets 116B equally distributed relative to a medial position of each wall of receptacle 100. Other distribution patterns for electrical sockets 116 will be dependent on the number and pattern of openings 104 and resulting location of signal portions 37 of signal wands 30. In addition to the specific distribution pattern of sockets 116, the interior walls of receptacle 100 can be fashioned with a highly reflective surface for improved light distribution within interior chamber 114 of receptacle 100.

Figure 8:
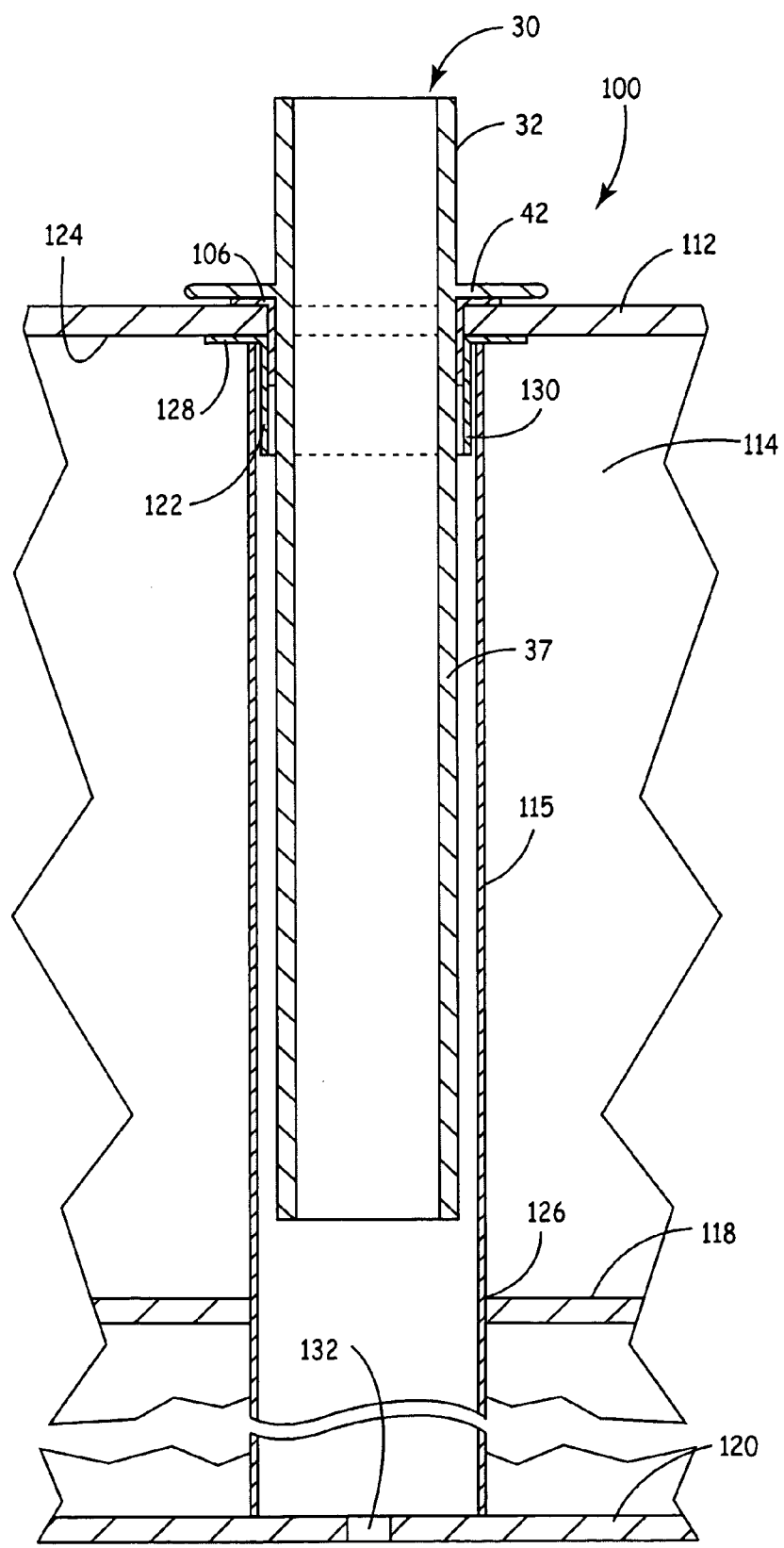
FIG. 8 is an enlarged cross-sectional view of one signal wand storage site of the storage system of FIG. 7.

FIG. 8 is an enlarged cross-sectional view of receptacle 100 cut away to isolate one of the clear protection tubes 115 that may form part of the interior chamber 114. To protect interior chamber 114 from outside contaminants, such as dust and moisture and further to protect the light source from inadvertent contact with a signal wand 32, a protective barrier in the form of tube 115 is associated with each opening 104. In one embodiment, tube 115 is formed from a clear durable polymer, such as acrylic. Tube 115 extends from top 112 to base 120 of receptacle 100 and is supported in place by a cylindrical support 122, which extends from inner surface 124 of top 112, and by an opening 126 in floor 118 that is sized and shaped complimentary to tube 115.

Cylindrical support 122 is comprised of a flange 128 and a cylindrical wall 130 that extends generally normal to flange 128. The cylindrical wall 130 of cylindrical support 122 has an outer diameter that is smaller than an inner diameter of tube 115, which permits an end of tube 115 to slide over the cylindrical wall 130. The cylindrical wall 130 has a length that is sufficient to support and retain tube 115 relative to opening 104. In one embodiment, cylindrical wall 130 extends from inner surface 124 by about 0.12 inch. Cylindrical wall 130 has an inner diameter approximating that of opening 104 to permit signal wand 30 to be inserted through opening 104 and into tube 115.

As shown in FIG. 8, with signal wand 30 fully inserted into receptacle 100, flange 42 of handle 40 rests against a portion of diaphragm 106 to prevent or at least minimize contaminants from entering receptacle 100. With signal wand 30 removed from receptacle 100, diaphragm 106 substantially covers opening 104 to a prevent or at least minimize dirt or moisture from entering receptacle 100. In the event any moisture passes through diaphragm 106 and opening 104, tube 115 prevents such contaminants from contacting electrical components contained within interior chamber 114 of receptacle 100. A drain hole 132 is provided in base 120 for each tube 115 to permit any moisture that may enter tube 115 to drain out of receptacle 100.

Figure 9:
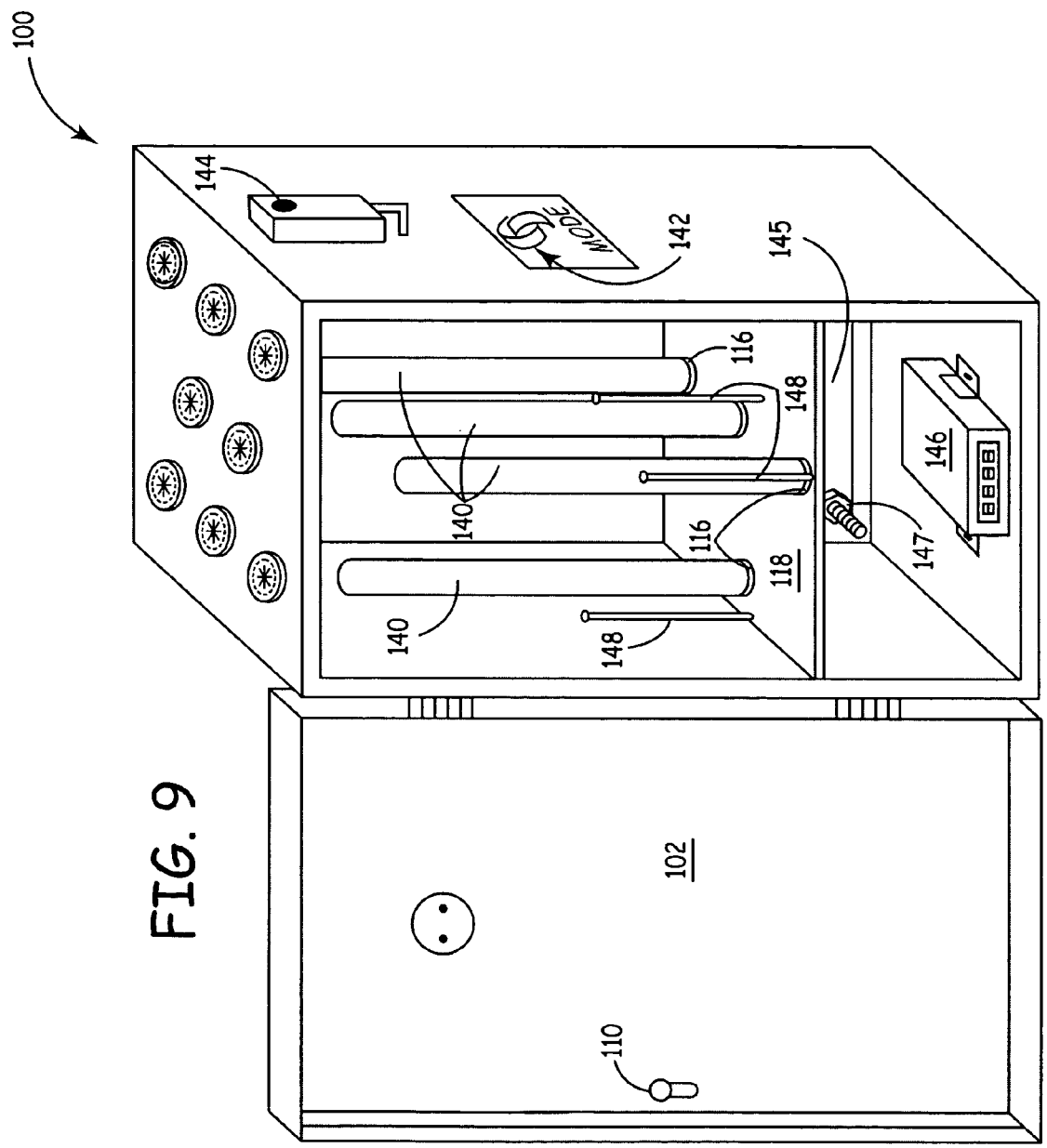
FIG. 9 is a front perspective view of an opened storage system of FIG. 6 with a plurality of light bulbs.

FIG. 9 is a front perspective view of opened receptacle 100 with light bulbs 140 inserted into electrical sockets 116. In one embodiment, light bulbs 140 are elongated, full spectrum fluorescent light bulbs that extend generally the length of interior chamber 114 to provide light to the full length of the signal portion 37 of signal wands 30. Light bulbs 140 may be powered by either alternating current or direct current and may be operated manually, automatically or on a timer based on a setting of a mode selector switch 142. When mode selector switch 142 is set to manual mode, a user manually adjusts a switch to turn on and off light bulbs 140. When mode selector switch 142 is set to automatic mode, a photo eye 144 mounted on an exterior of receptacle 100 and detects a decrease in ambient light and turns on light bulbs 140 in low light and nighttime conditions when signal wands 32 will need to be used in a glowing state. Alternatively, mode selector switch 142 may be set to a timer mode, which activates a timer 146 to turn on and off light bulbs 140 at a time set by a user. Mode selector switch 142 may also incorporate a setting that combines the automatic and timer features previously described to ensure that light bulbs 140 are turned on and off at a time certain in the event photo eye 144 fails or local ambient light is at too high a level.

As shown in FIG. 9, timer 146 may be housed in the space below elevated floor 118. In addition, a panel 145 may be mounted by a plurality of connectors 147 against one wall of receptacle 100 to create a storage space for wiring and other electrical components.

Located adjacent to each light bulb 140 is a sensor 148, which detects the level of light emitted from the corresponding light bulb 140. The light detected by sensor 148 is compared against a predetermined value. When light emitted from a light bulb 140 falls below the predetermined value, a warning indicator emits an audible or visual warning that a light bulb may be close to failing or has failed and requires replacement.

Figure 10:
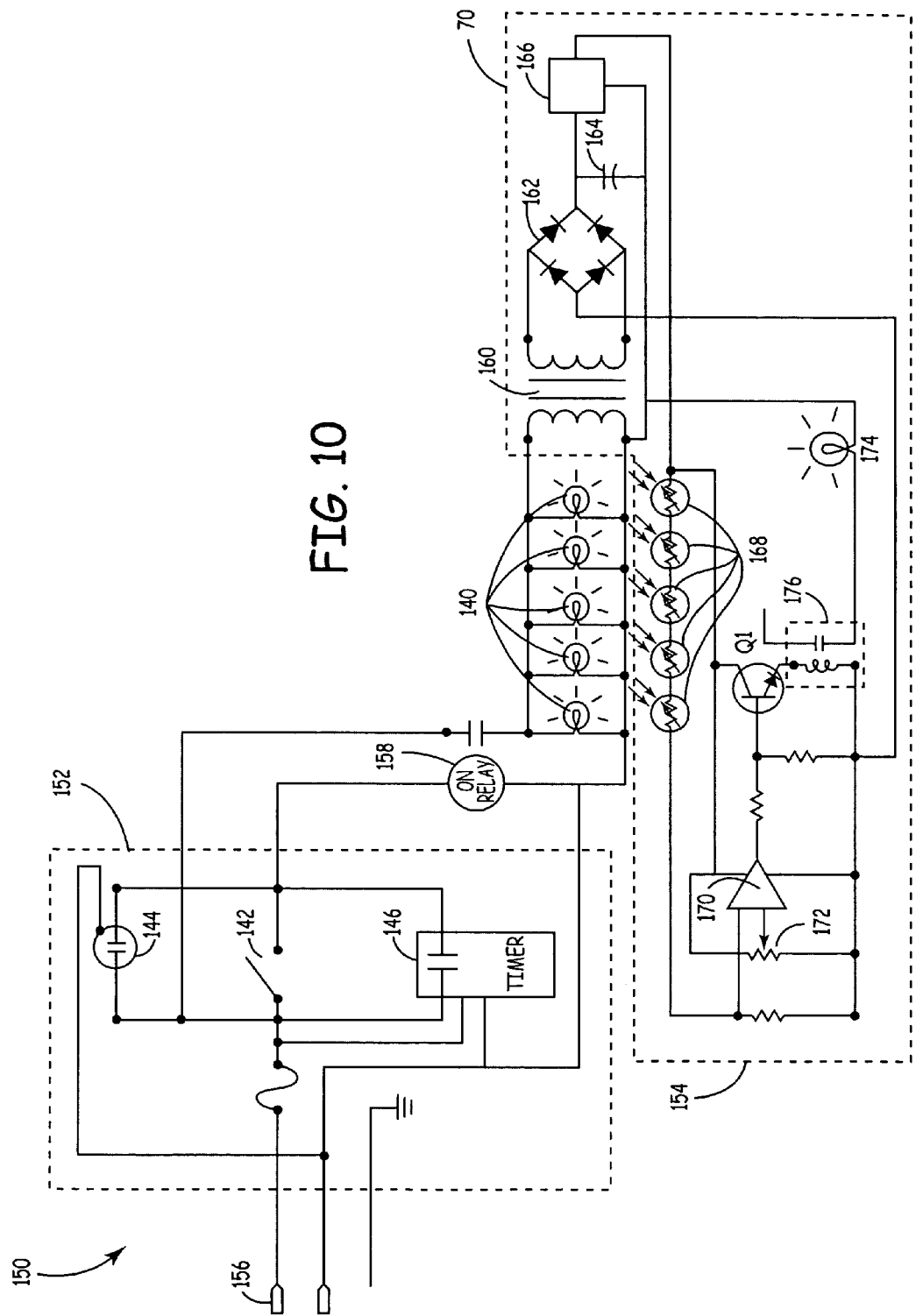
FIG. 10 is an electrical diagram of one embodiment of the storage system of the present invention.

FIG. 10 is a diagram of an exemplary embodiment of electrical system 150 of the present invention. The diagram includes specific details concerning the exemplary embodiment shown, but one of ordinary skill in the art will recognize that electrical system 150 could be implemented in a number of ways not shown here. Electrical system 150 includes control sub-system 152, the plurality of light bulbs 140, and warning sub-system 154. Generally, control sub-system 152 controls whether the light bulbs 140 are turned "on" or "off," while warning sub-system 154 detects when light bulbs 140 need to be replaced and alerts an operator. In the exemplary embodiment shown in FIG. 10, the light bulbs 140 operate off alternating current signal ("ac signal") 156, although a person of ordinary skill in the art would recognize that a direct current signal could also be used.

As discussed above, an exemplary embodiment of the present invention includes a number of ways for providing power to light bulbs 140 to charge signal wands 30, including a manual switch 142, a photo eye 144, and a timer 146. As shown, control sub-system 152 includes photo eye 144, timer 146, and manual switch 142 connected in parallel, each being capable of closing the electrical connection between ac signal 156 and relay 158, which is in turn connected to light bulbs 140. By connecting the photo eye 144, manual switch 142, and timer 146 in parallel, any one of the these three is capable of turning on light bulbs 140. Photo eye 144 closes the electrical connection between ac signal 156 and relay 158, which in turn is connected to light bulbs 140, when low levels of light are detected at the photo eye sensor. Timer 146 closes the electrical connection between ac signal 156 and relay 158, which in turn is connected to light bulbs, 140, at a specified time and for a specified amount of time, which in one embodiment is measured by timer 146 by counting clock cycles provided by ac signal 156.

Warning sub-system 154 of electrical system 150 shown in FIG. 10 operates to warn the operator when a light bulb 140 needs to be replaced. An exemplary embodiment of warning sub-system 154 is shown in FIG. 10, although warning sub-system 154 can be implemented in a number of ways by someone of ordinary skill in the art. Warning sub-system 154 begins by converting the ac signal 156 used to power light bulbs. 140 to a lower voltage direct current signal ("dc signal"). An exemplary embodiment of one such ac-to-dc converter is shown in FIG. 10, which is comprised of transformer 160, bridge rectifier 162, capacitor 164 and voltage regulator 166. The ac-to-dc converter functions to reduce the overall voltage of incoming ac signal 156 as well as to convert the reduced voltage ac signal to a dc signal. Transformer 160 operates to reduce the voltage of ac signal 156 to a lower voltage ac signal. Bridge rectifier 162 and capacitor 164 operate to convert the reduced voltage ac signal to a dc signal. Voltage regulator 166 is available to further reduce the voltage of the dc signal to the voltage level required by the remainder of the circuit.

The dc signal provided by the ac-to-dc converter is supplied to a number of light detecting devices 168, connected in series with one another. In an alternate embodiment (not shown), light detecting devices 168 may be connected in parallel with on another. Light detecting devices 168 have variable resistance characteristics based on the amount of light available, and may be implemented in a number of ways known in the art. In the exemplary embodiment shown, each light bulb 140 is paired with a light detecting device 168. When a particular light bulb 140 begins to dim and needs to be replaced, the light detecting device 168 paired with the particular light bulb 140 will increase in resistance. Because light detecting devices 168 are connected in series, a change in one light bulb 140 will result in an increase in the aggregate resistance of the light detecting devices 168. As the aggregate resistance of light detecting devices 168 increases, indicating one of the light bulbs 140 needs to be replaced, the overall voltage drop across the light detecting devices 168 will change. The output voltage from the light detecting devices 168 will decrease as the resistance of light detecting devices 168 increases. Thus, the output voltage from the light detecting devices 168 is dependent on the aggregate resistance of light detecting devices 168.

The output voltage from the light detecting devices 168 is used to decide whether or not a light bulb 140 needs replacing, and thus whether or not to activate a warning indicator. In an exemplary embodiment shown in FIG. 10, a comparator circuit is used to detect when to activate the warning indicator. The comparator circuit may be implemented in a number of ways by a person of ordinary skill in the art. The exemplary comparator circuit shown in FIG. 10 utilizes operational amplifier 170 to detect changes in the output voltage from light detecting devices 168. Operational amplifier 170, connected in an open gain configuration, detects differences in voltage between its two inputs. One input is the output voltage from light detecting devices 168, the other input is a reference voltage which in the embodiment shown includes the dc signal from the ac-to-dc converter and variable resistance potentiometer 172. Potentiometer 172 allows for tuning of the reference voltage to a desired level for comparison to the output voltage from light detecting device 168. Thus, if the aggregate resistance of light detecting devices 168 increases, the output voltage from the light detecting sub-system will decrease, which is detected by operational amplifier 170 and results in a corresponding output voltage, in this case the original dc signal used as a power supply to operational amplifier 170.

The output from operational amplifier 170 is used as a control input to a switch, turning on the switch when one of the light bulbs 140 needs replacing. In the exemplary embodiment shown in FIG. 10, the switch is a transistor Q1, although a person of skill in the art would recognize that a switch can be implemented in a number of different ways. When transistor Q1 is on, current is allowed to flow across transistor Q1, to warning indicator 174, turning the warning indicator on and indicating to the operator that a light bulb 140 needs replacing. In the exemplary embodiment shown in FIG. 10, the signal supplied by transistor Q1 when on, is used to activate relay 176, which allows a higher voltage, ac signal to activate warning indicator 174. Warning indicator 174 may be a light, as shown in FIG. 10. Alternatively warning indicator 174 may be an audible indicator or combination of visual and audible indicators.

The signal wand and storage system of the present invention provides a reliable, simple and cost-effective way of staging signal wands of the present invention for daytime or nighttime use. Specifically for use in guiding a person operating an aircraft in and around a gate area, the receptacle may be mounted to a suitable structure in the gate area, such as a moveable walkway, a pushout tractor or other vehicle, for convenient access to the signal wands when needed. During daylight, the signal wands are highly visible due to the high visibility pigment incorporated into the signaling portion. At night, or during low light conditions, the signal wands are stored next to the light source in the receptacle. The light source may be turned on manually, automatically by a photo eye or a timer, or any combination, in advance of low light conditions. Stored next to the light source for as little as five minutes, the signaling portion of the signal wands will glow brightly for a time sufficient to be very visible in dark or low light conditions. After use, the signaling wands are easily and simply inserted into the receptacle and stored next to the light source until they are needed again.

Although the present invention has been described with reference to certain specific embodiments, workers skilled in the art will recognize that changes may be made in form and detail without departing from the spirit and scope of the invention. For example, the receptacle may comprise any covering structure that at least partially surrounds a light source and isolates the electrical components from the elements and permits a plurality of signal wands having signaling portions comprising a photoluminescent material to be stored relative to the light source. The signal wands may be supported relative to the light source by any suitable holder.

The invention claimed is:

1. A system for providing signaling devices for use in low light conditions, the system comprising:
    a plurality of signal wands having a handle portion and a signaling portion, the signaling portion comprising a first cylindrical layer and a second cylindrical layer positioned over and generally coaxial to the first cylindrical layer, the second cylindrical layer comprising a high visibility pigment; and
    a plurality of light bulbs positioned proximate the signaling portion of the plurality of signal wands, each of the plurality of signal wands located relative to one or more of the plurality of light bulbs to receive light from a plurality of directions such that the signaling portion of each signal wand is substantially surrounded by light, wherein each of the plurality of light bulbs is electrically connected to a power source;
    wherein the first cylindrical layer comprises:
        first and second clear polymer coaxial tubes that combine to define a space therebetween, a photoluminescent powder positioned in the space, and end seals at first and second ends of the first and second coaxial tubes, the end seals containing the photoluminescent powder in the space.

2. The system of claim 1 wherein each light bulb of the plurality of light bulbs comprises a full spectrum fluorescent light bulb.

3. The system of claim 2 wherein each light bulb has a length generally approximating a length of the signaling portion, wherein the length of each light bulb extends generally adjacent to the length of the signaling portion of the plurality of signal wands.

4. The system of claim 1 wherein the first cylindrical layer comprises:
    a clear polymer tube having an outer surface;
    a first layer of adhesive applied to the outer surface of the polymer tube; and
    a first layer of photoluminescent powder applied to the first layer of adhesive.

5. The system of claim 1 wherein the second cylindrical layer comprises:
    a polymer the having a cylindrical wall, the cylindrical wall comprising alternating clear portions and high visibility pigmented portions.

6. The system of claim 5 wherein the alternating clear portions and high visibility pigmented portions extend longitudinally and are radially spaced relative to one another.

7. The system of claim 1 wherein the second cylindrical layer is radially spaced from the first cylindrical layer.

* * * * *